(12) United States Patent
Wolters et al.

(10) Patent No.: US 6,513,618 B1
(45) Date of Patent: Feb. 4, 2003

(54) POWER STEERING SYSTEM

(75) Inventors: Bernd Wolters, Berg (DE); Philip Koehn, Munich (DE); Michael Sagefka, Aachen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/787,695
(22) PCT Filed: Aug. 4, 2000
(86) PCT No.: PCT/EP00/07626
§ 371 (c)(1), (2), (4) Date: Mar. 22, 2001
(87) PCT Pub. No.: WO01/14201
PCT Pub. Date: Mar. 1, 2001

(30) Foreign Application Priority Data

Aug. 24, 1999 (DE) .......................... 199 40 026

(51) Int. Cl.⁷ .............................. B62D 5/06
(52) U.S. Cl. ......................... 180/403; 180/442
(58) Field of Search ............... 180/403, 417, 180/421, 422, 423, 442

(56) References Cited

U.S. PATENT DOCUMENTS

| | | | |
|---|---|---|---|
| 4,293,051 A | * 10/1981 | Nishikawa | 180/406 |
| 4,303,089 A | * 12/1981 | Gage et al. | 137/110 |
| 4,830,131 A | 5/1989 | Miyoshi et al. | 180/141 |
| 5,313,389 A | * 5/1994 | Yasui | 180/404 |
| 5,390,948 A | * 2/1995 | Kuriki et al. | 280/5.508 |
| 5,515,277 A | * 5/1996 | Mine | 280/5.513 |
| 5,600,955 A | 2/1997 | Sahinkaya | 60/469 |

FOREIGN PATENT DOCUMENTS

| | | |
|---|---|---|
| DE | 37 21 826 C1 | 7/1987 |
| DE | 39 29 175 A1 | 9/1989 |
| DE | 41 12 735 C2 | 4/1991 |
| DE | 195 11 091 A1 | 3/1995 |
| WO | WO 91/17912 | 5/1991 |

OTHER PUBLICATIONS

"Innovationen in Der Fluidtechnick" O+P—Othydraulik und Pneumatik—39, Nr. 4, Apr. 1995, p. 314, 315.

* cited by examiner

Primary Examiner—Kevin Hurley
(74) Attorney, Agent, or Firm—Crowell & Moring LLP

(57) ABSTRACT

A power steering system for a motor vehicle comprising a hydraulic reaction device (11) by which reaction power is generated on the steering column of the vehicle, depending on the speed thereof. According to the invention, a accumulator (14) is provided on the line (13) connecting the reaction device (11). Said accumulator serves as a low-pass filter and decouples the reaction device from oscillations in pressure due to uneven road surfaces.

15 Claims, 1 Drawing Sheet

POWER STEERING SYSTEM

BACKGROUND AND SUMMARY OF THE INVENTION

This application claims the priority of German patent document 199 40 026.1, filed Aug. 24, 1999, and PCT International Application No. PCT/EP00/07626, filed Aug. 4, 2000, the disclosures of which is expressly incorporated by reference herein.

The invention relates to a power steering system having a hydraulic feedback arrangement that generates a reaction force at the steering column.

German patent document DE 41 12 735 C2 discloses such a power steering system, in which the steering reaction is generated as a function of the speed of the motor vehicle, and can be felt by the driver of the motor vehicle as a steering resistance. In the connecting line of this feedback device there is a throttle for adjusting the characteristics of the power assist.

In motor vehicles of the current 5 and 7 series of the assignee of this application, a power steering system, called "Servotronic", is installed as optional equipment. Contrary to the power steering systems such as is known from the German patent document DE 41 12 735 C2, in which the feedback is the result of the amount of power assist, these motor vehicles of the assignee have a separate feedback device, where a reaction force is applied to the steering shaft by way of a pressure drop at a series connection of hydraulic resistors.

In known steering systems high frequency pressure surges, which generate only a low volume flow, are not affected in principle by the hydraulic resistance. Consequently high frequency pressure fluctuations, generated, for example, when driving on rough roads, are passed largely unfiltered into the feedback device and induce steering wheel torque jolts over both the working cylinder of the power steering system and the hydraulic feedback device. Especially in the case of rack and pinion steering systems with their comparatively low mass moments of inertia, road excitations lead to a "bumpiness" in steering.

One object of the invention is to provide an improved power steering system of the type described above.

This and other objects and advantages are achieved by the power steering system according to the invention, in which the vibrating behavior of the liquid column in the connecting line of the feedback device is influenced as a function of the frequency of the vibrations. To this end, there is preferably a hydraulic low pass filter, which is effective to filter out jolts which have a frequency above that of typically introduced steering movements (claim 6).

In one embodiment of the invention, the filter includes a hydraulic capacitor, which is formed, for example, by a piston-type, bladder or diaphragm accumulator. Furthermore, the hydraulic capacitor can also be implemented by especially elastic walls of the oil-conducting chambers inside the steering system. Such a configuration can be achieved, for example, with a hose connection. The hydraulic capacitor can be combined with a hydraulic resistor (constrictor or throttle) in series connection, according to a preferred arrangement of the invention.

Other objects, advantages and novel features of the present invention will become apparent from the following detailed description of the invention when considered in conjunction with the accompanying drawings.

DETAILED DESCRIPTION OF THE DRAWINGS

Figure 1:
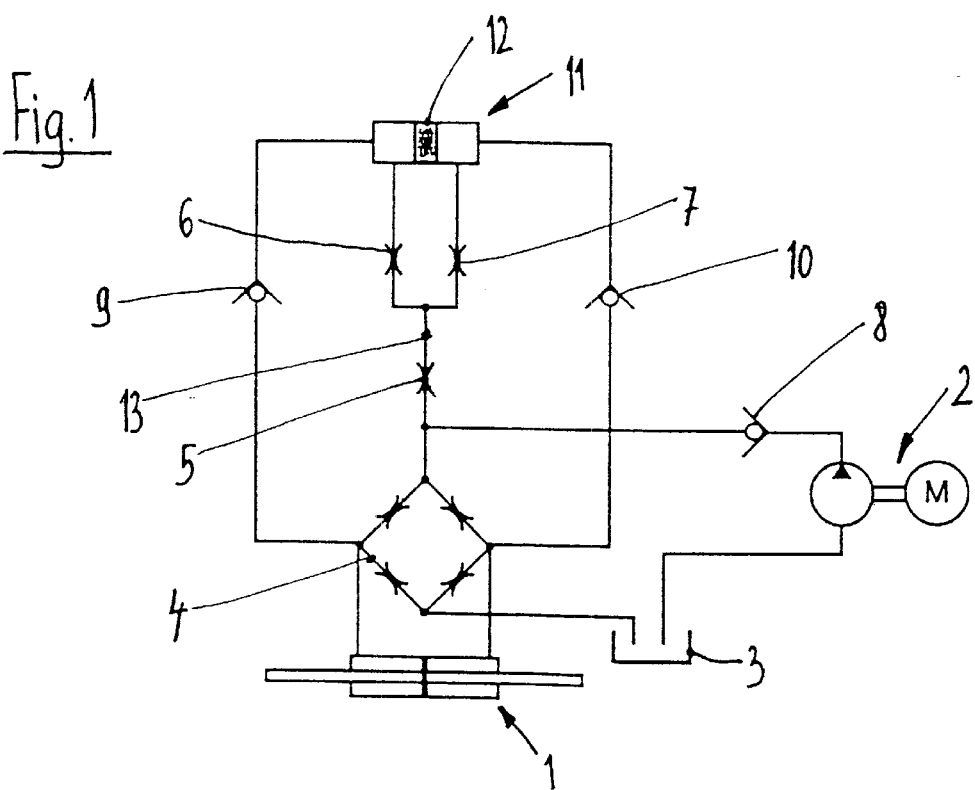
FIG. 1 depicts a power steering system according to the prior art.

The schematic drawing of FIG. 1 shows a power steering system for a motor vehicle, where the steering movement is assisted by a hydraulic working cylinder 1. A power steering pump for pressurization with hydraulic oil is marked with the reference numeral 2. The hydraulic oil is taken from a supply tank 3 and recycled again into the same. Steering movements at a steering column (not illustrated) are passed into the power steering system by means of a steering valve 4. The latter is connected to a feedback device 11 by means of a connecting line 13, in which a transducer 5, formed as a solenoid valve, and hydraulic resistors 6 and 7 are located.

In the event of steering wheel movements the hydraulic resistors 6 and 7 produce variable pressure differentials, with which a feedback piston 12 is driven in the feedback device 11. The transducer 5 activates the feedback device 11 as a function of the speed of the motor vehicle so that there is a speed-dependent steering wheel torque feedback to the steering column. A check valve 8 in the direction of the pressure side of the power steering pump 2 minimizes vibrations in the power steering system. The check valves 9 and 10 effect the desired activation of the feedback device 11 as a function of the direction of movement of the working cylinder 1, together with the transducer 5 and the hydraulic resistors 6 and 7.

Low frequency pressure fluctuations or stationary pressure ratios, stemming from intentionally initiated steering movements of the driver, generate a desired steering wheel torque feedback. Pressure fluctuations of higher frequency, due for example to an uneven road surface, can be affected only slightly by the hydraulic resistors 6 and 7, since these higher frequency pressure fluctuations induce only a very low volume flow. Consequently the higher frequency pressure fluctuations are passed largely unfiltered to the feedback device 11 and induce at the feedback piston 12 pressure differentials that result in steering wheel torque jolts at the steering gear input, and thus at the steering column.

Figure 2:
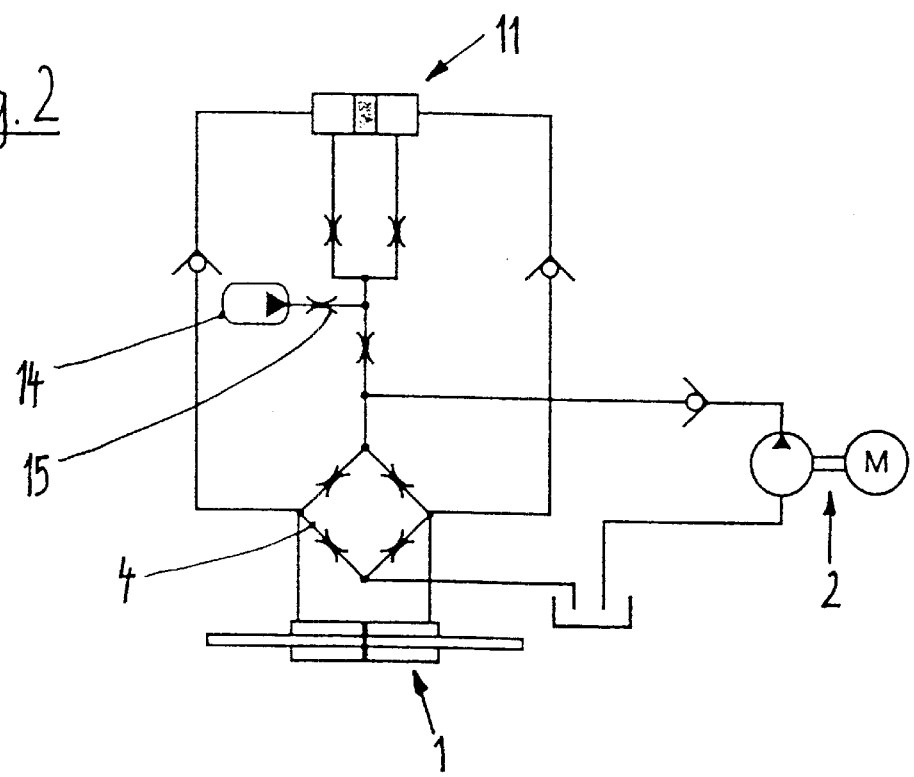
FIG. 2 depicts the power steering system according to the invention.

As apparent from FIG. 2, the invention provides at the connecting line 13 between the steering valve 4 and the feedback device 11 a hydraulic accumulator 14, which acts as the hydraulic capacitor. The accumulator 14 does not affect the low frequency pressure fluctuations, induced by the steering movements, or the stationary pressure ratios and thus the steering behavior of the motor vehicle. In contrast, however, the accumulator 14 uncouples disturbing higher frequency pressure fluctuations from the feedback device 11. This desirable feature is achieved by appropriately tuning the accumulator 14 to the power steering system, especially the hydraulic resistors 6 and 7; as a result, higher frequency pressure fluctuations queue at the resistors 6 and 7 with a reduced pressure gradient, owing to the smoothing effect of the accumulator 14 and generate there a correspondingly lower pressure drop and thus also lower throughflow.

The described "low pass effect" of the accumulator 14 specifically filters out the road-induced jolts, which, in addition to the direct mechanical introduction over the steering linkage, are passed into the steering system over a hydraulic path of action. In this manner the hydraulic path for introducing vibrations is specifically damped, so that steering comfort is improved by preventing or significantly reducing the introduction of vibrations.

Known measures for reducing the jolts, for example by means of check valves 8 in the pressure line between the power steering pump 2 and the steering valve 4 or a mechanical steering wheel shock absorber are less effective in this respect, since these methods cannot prevent hydraulic feedback over the feedback device 11.

The threshold frequency, at which the low pass filter acts, preferably lies below the frequency of the natural vibration of the axles that ranges from approximately 12 to 20 Hz in passenger cars. In other types of motor vehicles, the natural frequency of the axles can also occur down to and into the range of 5 Hz. On the other hand, the low pass filter cannot negatively affect pressure fluctuations that stem from intentional steering wheel movements and reach a frequency of up to about 2 Hz.

According to the embodiment of the invention, according to FIG. 2, the accumulator 14 is disposed in a blind line between the transducer 5 and the hydraulic resistors 6 and 7 and is thus formed preferably as a diaphragm or bladder accumulator. Depending on the design of the power steering system, however, it is also possible to integrate the accumulator 14 as an expansion hose, provided with elastic walls, directly into the connecting line 13 between the transducer 5 and the hydraulic resistors 6 and 7, thus forming the accumulator 14 as the throughflow accumulator.

As also depicted in FIG. 2, in addition to the accumulator 14, a hydraulic resistor 15 can be connected in series, making it possible to further tune the low pass filter. In so doing, primarily the degree of damping and the gradient of the pressure buildup are affected, whereas the dimensioning of the threshold frequency follows automatically from the layout of the accumulator 14.

The distinction between the arrangement of the accumulator 14 (and the hydraulic resistor 15) downstream of the transducer 5 and other possible arrangements lies in its especially high efficiency.

Preferred fields of application of the invention are rack and pinion steering systems, where road-induced jolts are damped only inadequately owing to the lower mass moments of inertia of the individual components of the steering system. Of course, the invention can be used in all types of steering systems, for example in recirculating ball steering systems. The additional cost for an accumulator 14 and optionally another hydraulic resistor 15 is comparatively low, since the said components are standard components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A power steering system for a motor vehicle, having a hydraulic feedback device connected by a feedback connection line to a steering mechanism of the vehicle, for producing a steering reaction at the steering column of the motor vehicle, comprising:
   a device connected in pressure flow communication with the feedback connecting line, for influencing a fluid column in the feedback connecting line, as a function of a frequency of vibration of the fluid column;
   the device for influencing the fluid column comprises at least one hydraulic low pass filter; and
   a cutoff frequency of the low pass filter lies above a frequency of steering movements introduced by a driver of the motor vehicle.

2. The power steering system according to claim 1, wherein the device for influencing the fluid column comprises at least one hydraulic low pass filter.

3. The power steering system according to claim 1, wherein the device for influencing the fluid column includes a hydraulic resistor.

4. The power steering system according to claim 1, wherein the device for influencing the fluid column includes a hydraulic capacitor.

5. The power steering system according to claim 4, wherein the device for influencing the fluid column includes a hydraulic resistor.

6. The steering system according to claim 1, wherein the device for influencing the fluid column is disposed between a transducer, which controls a rate of fluid flow in the feedback connection line as a function of speed of the motor vehicle, and the feedback device.

7. The power steering system according to claim 2, wherein a cutoff frequency of the low pass filter lies above a frequency of steering movements introduced by a driver of the motor vehicle.

8. The power steering system according to claim 4, wherein the hydraulic capacitor comprises at least a section of a hose connection of the steering system, which section has walls whose elasticity is preselected to achieve a desired damping effect.

9. The power steering system in accordance with claim 1, wherein said cutoff frequency is set at approximately two Hz.

10. A vehicle steering mechanism, comprising:
    a working cylinder for assisting steering of vehicle wheels;
    a steering valve for applying pressure to the working cylinder in response to steering inputs by a vehicle operator;
    a feedback device for transmitting reaction forces in response to pressure transmitted from said steering valve;
    a feedback connection line connecting said steering valve in pressure flow communication with said feedback device; and
    a hydraulic pressure accumulator connected in pressure flow communication with said feedback connection line;
    wherein the hydraulic pressure accumulator comprises at least a hydraulic low pass filter having a cutoff frequency that is above a frequency of steering movements introduced by a driver of the vehicle.

11. A vehicle steering mechanism according to claim 10, wherein said hydraulic pressure accumulator is a hydraulic low pass filter.

12. A vehicle steering mechanism according to claim 10, wherein said low pass filter further includes a hydraulic resistor.

13. A vehicle steering mechanism according to claim 10, wherein the hydraulic pressure accumulator comprises at least a section of a hose connection of the steering system, which section has walls whose elasticity is preselected to achieve a desired damping effect.

14. The vehicle steering mechanism according to claim 10, wherein the hydraulic pressure accumulator is disposed between a transducer which controls a rate of fluid flow in the feedback connection line as a function of vehicle speed, and the feedback device.

15. The power steering system in accordance with claim 10, wherein said cutoff frequency is set at approximately two Hz.

* * * * *